Jan. 11, 1966  J. T. STEWART  3,228,735
DAMAGE INDICATORS FOR CAR AXLE BEARINGS
Filed March 7, 1961  2 Sheets-Sheet 2

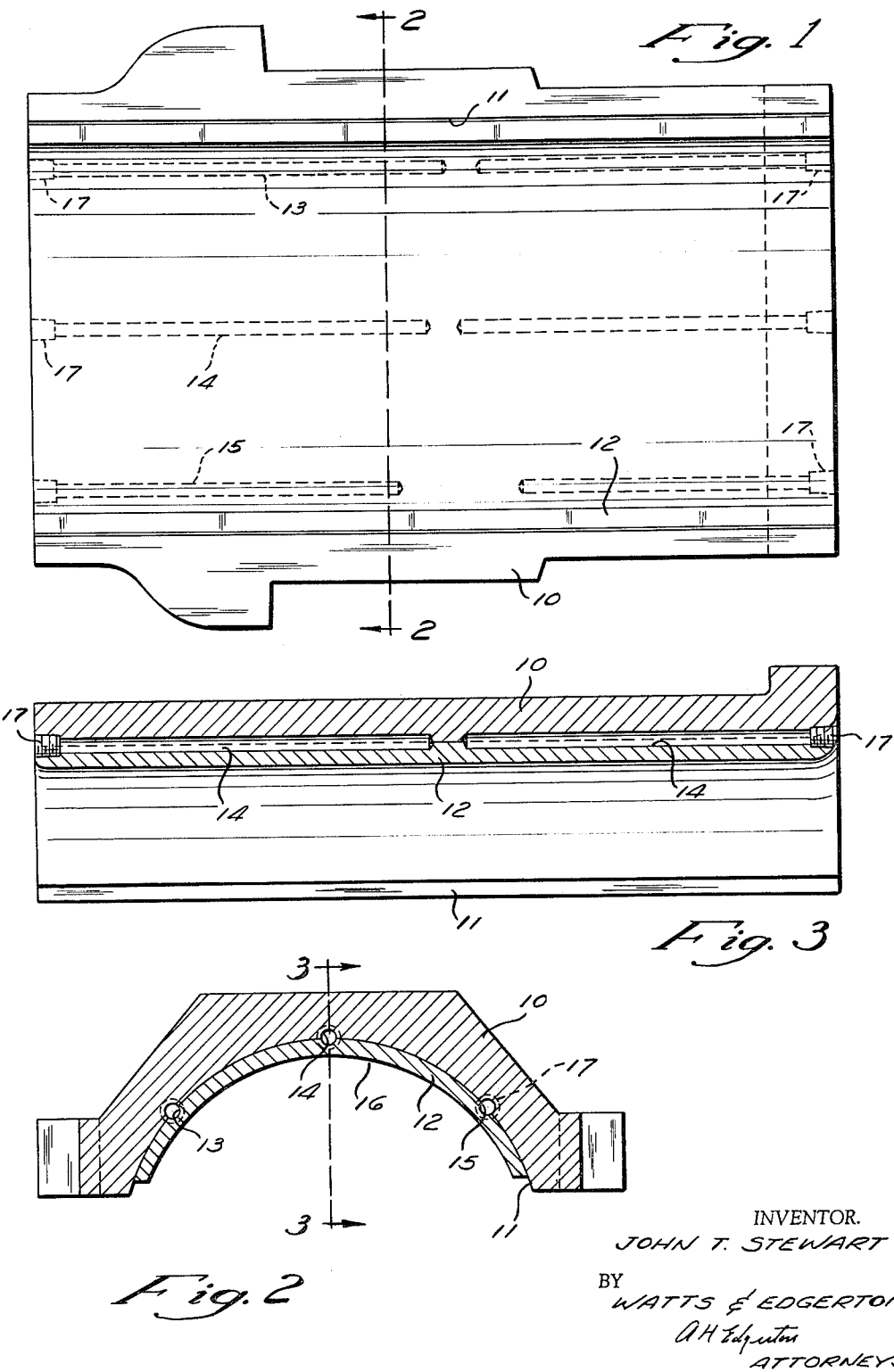

INVENTOR.
JOHN T. STEWART
BY
WATTS, EDGERTON, PYLE & FISHER
ATTORNEYS

United States Patent Office 3,228,735
Patented Jan. 11, 1966

3,228,735
DAMAGE INDICATORS FOR CAR AXLE
BEARINGS
John T. Stewart, 2200 Prospect Ave., Cleveland, Ohio
Filed Mar. 7, 1961, Ser. No. 94,083
13 Claims. (Cl. 308—38)

This application is a continuation-in-part of my copending application Serial No. 819,074, filed June 9, 1959, and allowed September 15, 1960, and now abandoned.

This invention relates broadly to improvements in journal bearings, and more specifically to means for indicating incipient damage to the bearings of railway cars including damage caused by wear and overheating.

One object of this invention is to provide means for automatically indicating a condition of incipient damage to a railway car bearing.

Another object of this invention is to provide, in a plurality of places adjacent to the axis, a substance capable of indicating damage to the lining, as by wear or overheating, before the damage has become sufficiently excessive to cause a "hot-box."

Another object is to provide means for detecting such damage, by conventional detectors of electromagnetic emissions from radioactive material.

The term journal bearing, as used herein, embodies the brass or similar metal block to which soft metal wear linings are bonded, as well as to roller bearings and their races. These bearings rest on the smooth surfaced surfaces on the ends of the axles which are located outside of the wheels and which are referred to as journals.

Such linings, disposed between the journal and the bearing block, are subject to wear and absorb any foreign particles which may be present and which might score the journal.

One of the reasons for journal bearing failure is the lack of oil or other lubricant in contact with the journal. When a journal bearing runs dry, heat is developed by friction which may result in excessive wear to, or even melting of, the lining, and in crystallization of the journal and possibly in derailment of the train. The journal bearing is also subject to localized wear in zones above the vertical center line of the axle during slow constant speeds, and in zones at about 45° to that center line during acceleration, braking or reversal of rotation, all of which tend to break down the normal oil film on the journal and thus hasten the wear of the lining. Bearing failure frequently necessitates costly replacement of the wheels and axles, effectuates substantial delay, causes loss of freight and equipment, and often endangers the lives of the passengers and crew members of the train. Failure or undue damage to a lining whether by reason of excessive wear or temperature can, therefore, be attributed primarily to lack of satisfactory lubrication.

Journal bearing failures have been found more numerous since the advent of diesel engines, since the increased speed and acceleration, made possible thereby, exaggerates the damage to the lining which is initiated by the repeated and violent shocks experienced when a car is shunted back and forth in switch yards. While roller bearings have less tendency to failure due to rolling friction, they are still subject to damage by overheating due to resultant softening.

The present invention overcomes the foregoing difficulties through the provision of an indicator to apprise the railroad maintenance crew of incipient damage to the bearings due to wear or overheating.

In the embodiment of this invention disclosed in my copending application, Serial No. 819,074, the invention comprehends a damage indicator disposed in a plurality of small, circumferentially spaced, axial holes, preferably between one-sixteenth and one-eighth of an inch in diameter, and disposed to provide a liner wall thickness of one-eighth of an inch (the approved tolerance of wear in a journal bearing lining), between the hole and the journal engaging face of the lining. The holes in each lining may be charged with an oil soluble dye such as fluorescein ($C_{20}H_{12}O_5$) which emits a very brilliant, yellowish-green fluorescence in the presence of ultra-violet radiation. Railroad car journal boxes usually contain oil, oil soaked cotton waste, or grease, any of which will readily absorb the dye when the lining is sufficiently worn to establish intercommunication between the journal box and the dye containing holes or pockets. The damaged condition of the lining can be readily detected by use of a dip stick in daylight, or an ultra-violet light at night when the indicator has entered the lubricant.

Obviously, the invention is not limited to the particular chemical compound referred to above, since a dye belonging to any of the classes of the fluorols, acridines, rhodamines, eosines or eurthodines, may be used with similar or equal results. Pure dyes, such as those of the oil soluble azo group, are also included in such invention. Moreover, compounds which will foam or effervesce in the presence of temperatures high enough to damage a journal bearing may be used. Such compounds may be used in the form of a solution, paste, dry powder, wax, etc., and are contemplated herein.

The present invention will be better understood by those skilled in the art from the following description considered in connection with the accompanying drawings, in which:

FIG. 1 is a plan view of the lower face of the journal bearing embodying one form of this invention in which dye material is the indicator;

FIG. 2 is a transverse sectional view through the journal bearing of FIG. 1, the section being taken on a plane indicated by the line 2—2 of FIG. 1;

FIG. 3 is a longitudinal sectional view through the journal bearing of FIG. 1, the section being taken on a plane indicated by the line 3—3 in FIG. 2;

Figure 4:
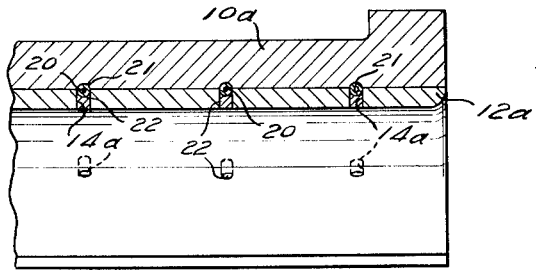
FIG. 4 is a plan view similar to FIG. 3 but in which radioactive material is used as an indicator.

Referring to FIGS. 1 to 3, the journal bearing comprises a generally rectangular block 10 of cast brass or other suitable material. The lower face 11 of the block 10 has a concave face provided with a Babbitt or similar metal lining 12 bonded thereto, and a plurality of small holes, such as the holes 13, 14 and 15 are formed, as by drilling, partly in the block and partly in the liner.

These holes are arranged so that their circumferential edges thereof are not more than about one-eighth of an inch from the wear face 16 of the lining 12, such diameter being the approved wear tolerance for liners specified by the American Association of Railroads (A.A.R.). It will be noted that these holes are located in zones above the vertical center line of the liner and about 45° on either side of the center line, that is, in the zones where wear by the journal is greatest. The holes are plugged at one end of the journal bearing by pipe plugs 17, or straight threaded plugs approximately one-quarter of one inch in length and composed of brass, copper or metal fusible at a low temperature such as Wood's metal or Babbitt. An indicator, such as fluorescein, co-mixed with wax, paste or a dye in powdered form, is injected, or is inserted in rod form, into the holes. Thereafter, the holes are sealed by plugs 17 to prevent the escape of the indicator. If desired, the holes 13, 14 and 15 may be drilled from each end of the journal bearing at variable length, then plugged after the dye material is inserted therein.

The blocks 10 are mounted in housings formed in the wheel supporting trucks. The housings, which are generally referred to as journal boxes, each comprises a prismoidal chamber containing oil soaked cotton waste, oil, or grease, to lubricate the journal bearing and has a hinged cover (not shown) to permit access to the lubricant. In the present embodiment of the invention, the cover may be made of a hard rubber plate and may have a transparent window, such as laminated shatter-proof glass, or a tubular sight gauge, to facilitate visual inspection of the lubricant in the box. The cover is hinged to permit the insertion of a dip stick into the lubricant in the box.

When the metal of the lining 12 wears through the metal wall of the lining subjacent the holes 13, 14 and 15, or any one of them or the plugs or lining melts, the indicator in the axial holes in the lining may enter the lubricant in the journal box, where its presence may be detected as described above. Such detection will alert the maintenance crews to imminent danger of excessive damage to the bearing.

Obviously, the stain referred to above is only one of numerous similar dyes that may be employed or used in substitution of fluorescein. If desired, a chemical that is highly effervescent when heated, or a chemical having a strong persistent odor, such as musk, may be employed as a tell-tale of wear and damage to the journal bearing.

Figure 5:
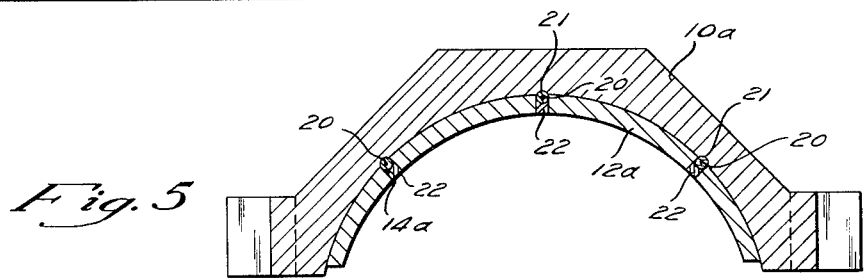
FIG. 5 is a view similar to FIG. 2 but showing the apparatus of FIG. 4.

The modification of the present invention which is shown in FIGS. 4 to 7, inclusive, employs a damage indicator in the form of radioactive material. As is indicated in FIGS. 4 and 5, the liner 12a of block 10a is provided with a plurality of recesses, indicated at 14a in FIGS. 4 and 5. These recesses extend into the liner from its inner surface at a plurality of places and may project a short distance into the block 10a. The inner end of the indicator should be not less than about ⅛ inch from the inner surface of the liner to allow for the customary amount of contemplated wear before the indicator is liberated.

Indicators in the form of minute pellets 20 composed of radioactive material are enclosed in shielding material 21 and are placed in each of the recesses 14a, and are sealed in place, as by low melting temperature metal 22, such as the metal of the lining. The shielding material may be lead or any other conventional metal capable of absorbing electromagnetic radiations from the radioactive material.

Any of a number of well known radioactive materials may be used for this purpose, such as artifically radioactive isotopes, preferably emitting gamma rays, as for example low cost cobalt 60, but care should be taken to employ only such a quantity of the material as may be effectively shielded in the surrounding envelope 21 in order that electromagnetic radiations emitted by the material will not travel out of the block far enough and in sufficient quantity to be detected by a conventional detector such as a scintillation counter, suitably mounted at each side of a track. Not more than about 0.1 milligram of cobalt 60 should be present in one pellet and other isotopes should be used in corresponding amounts.

It will be understood that when the lining 12a is damaged either by wear or by being subjected to high temperatures, the pellets 20 will be damaged to the extent that the shielding will permit escape of emissions which may then be detected by a suitable detector.

Figure 6:
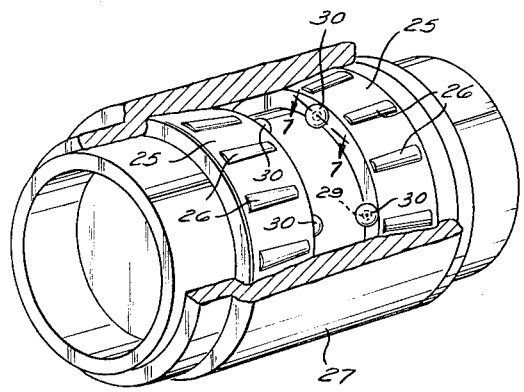
FIG. 6 is a perspective view with parts broken away and showing a roller bearing for a railway car equipped with a radioactive indicator.
Figure 7:
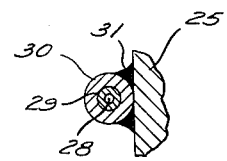
FIG. 7 is an enlarged fragmentary view taken on line 7—7 of FIG. 6.

FIGS. 6 and 7 show a conventional roller bearing assembly equipped with a radioactive indicator. Races 25, carrying a plurality of rollers 26, surround a journal (not shown) and are enclosed in housing 27 on which rests the truck which supports load-carrying springs and the car bolster.

The damage indicators consist of minute amounts of radioactive material 28 enclosed in low melting point shielding material 29 which is surrounded by additional material 30. This indicator is disposed in the recess between races 25, in the space normally filled with lubricant, and may be soldered or otherwise suitably attached to the inner end of one of the races, as shown at 31 or to the inner surface of housing 27. It will be understood that the shielding materials 29 and 30 should have a melting temperature such that it will melt before damage to the bearings occurs. When roller bearing temperatures exceed about 300° F., the temper of the hardened steel races and rollers may be partly "drawn," that is, the hardness of the wearing parts may be reduced with resultant increased rate of wear. When the lubricant, for example, grease, is at a temperature above about 125° F., it tends to soften and flow more rapidly into the path of the rollers with resultant increased frictional resistance to the rotation of the rollers in their races, and ultimate separation of the lubricant into its soap and oil bases, with resultant loss of its lubricant qualities. When the shielding materials 29 and 30 are composed of predetermined low melting point metal, for example Wood's alloy or other lead alloys which melt at about 250° F., the radioactive material will be liberated and emissions therefrom can be detected before the grease loses its lubricating qualities or the hardened steel rollers and races are softened.

Figure 8:
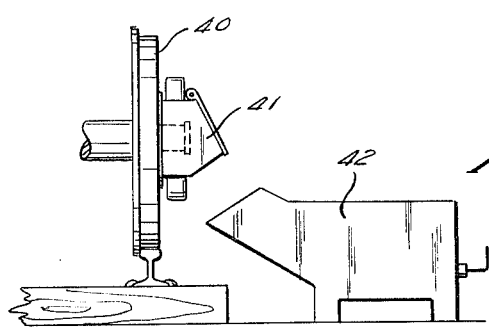
FIG. 8 illustrates the manner and means of detection which may be employed with the apparatus of FIGS. 4 to 6.

The manner of detection of emissions from the radioactive material which is embodied in pellets as shown in FIGS. 4 to 7, is diagrammatically indicated in FIG. 8. That figure shows a car wheel 40 having a lubricant carrying journal box 41 in which radiation emitting isotopes may be freed from their shielding metal as above described. The radiations from such liberated material may be detected by any conventional detector, for example, the scintillation counter shown at 42 and fixed in position along the railroad track in proximity to journal boxes on cars moving therepast. A similar detector may be mounted along the opposite sides of the railway adjacent to the journal boxes on the opposite side of the cars.

Any conventional recorders may be used with these counters to indicate whether electromagnetic radiations are escaping from the shielding material.

Another means of detecting the electromagnetic emissions from the liberated radioactive material is that of painting the journal box with a paint which becomes phosphorescent when excited by electromagnetic radiations from radioactive material. The ability of radioactive radiations to activate phosphors suitably mounted on the journal box would provide high brightness levels of luminescence, or monitoring film, would give visible warning to personnel of a damaged bearing.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. In combination, a railway journal bearing including a backing block and a metal wear lining for engaging a shaft journaled in said bearing, said lining having a semi-cylindrical wear surface and spaced end walls, and a detection system for detecting bearing damage, said detection system including longitudinally extending holes formed at least in part in said lining adjacent to said wear surface, said holes extending substantially the full length of said lining between said end walls and being disposed in a first position lying in a vertical plane passing through the axis of said bearing, and in second and third positions circumferentially spaced approximately 45° on each side of said vertical plane, and a flowable damage indicator sealed in said holes.

2. The combination of elements set forth in claim 1 in which the distance between the circumferences of the holes and wear face of the lining surface is substantially equal to the predetermined wear tolerance for the lining.

3. The combination of elements set forth in claim 1 in which the circumferential surfaces of the holes in the lining are positioned not more than about ⅛ inch from the wear face of said lining.

4. The combination of elements set forth in claim 1 in which low melting point fusible plugs seal the ends of the holes in each of said end walls.

5. The combination of elements set forth in claim 1 in which the wear indicator is an oil soluble dye.

6. The combination of elements set forth in claim 1 in which the wear indicator is an effervescent, heat-responsive chemical or compound.

7. The combination of elements set forth in claim 1 in which the wear indicator is an odoriferous compound.

8. In combination, a railway journal bearing construction comprising a backing member, bearing means within said backing member, journal means surrounded by said bearing means, said bearing construction having areas formed by contacting portions of said bearing means and journal means which are subject to wear and overheating, and flowable damage indicating means within said areas of said bearing construction, said flowable damage indicating means being disposed along the length of said journal means in a first longitudinally extending line lying in a vertical plane passing through the axes of said bearing construction, and in second and third longitudinally extending lines circumferentially spaced approximately 45° from said first line on each line of said vertical plane.

9. The combination as claimed in claim 8 wherein said flowable damage indicating means comprises pellets of radioactive material disposed in shields, each of said shielded pellets being positioned in a recess in said bearing construction so that the shields will be exposed to damage in said areas formed by contacting portions of said bearing means and journal means, whereby the resultant escape of electromagnetic emissions will indicate incipient damage to said bearing construction.

10. The combination of elements set forth in claim 9 with means for detecting emissions from the radioactive material when exposed by damage to the shield.

11. In combination, a railway journal bearing including a backing block and a metal wear lining for engaging a shaft journaled in said bearing, said lining having a semi-cylindrical wear surface and spaced end walls, and a detection system for detecting damage of said lining, said detection system including a plurality of radially extending holes formed in said lining, said holes being longitudinally spaced between said end walls in a first line lying in a vertical plane passing through the axis of said bearing, and in second and third lines circumferentially spaced approximately 45° from said first line on each side of said vertical plane, shielded pellets of radioactive material in each of said holes, and plugs formed of a low melting temperature metal sealing said shielded pellets in said holes, said plugs being exposed on said wear surface.

12. In combination, a railway journal bearing comprising a cylindrical housing, a pair of longitudinally spaced bearing races in said housing, a plurality of bearing rollers carried by each of said races, a journal disposed in said housing and surrounded by said races, said rollers contacting said journal to form areas which are subject to wear and overheating, said races, journal and housing defining a recess, said recess being in communication with said areas of journal and roller contact and being operatively filled with lubricant for said bearing, and damage indicating means connected to said railway journal bearing in said recess so as to be exposed to the lubricant therein, said damage indicating means including a plurality of shielded pellets of radioactive material.

13. The combination as claimed in claim 12 including a journal box, said housing being mounted in said journal box, said journal box having a visible portion coated with a paint which becomes phosphorescent when excited by the escape of electromagnetic emissions.

References Cited by the Examiner

UNITED STATES PATENTS

| | | | |
|---|---|---|---|
| 1,361,000 | 12/1920 | Blain | 308—53 |
| 1,662,901 | 3/1928 | Ripley | 308—53 |
| 1,921,884 | 8/1933 | Horger | 308—180 |
| 1,979,875 | 11/1934 | Faus | 308—1.5 X |
| 2,065,614 | 12/1936 | Scribner | 184—1 |
| 2,658,724 | 11/1953 | Arps | 250—106 |
| 2,742,332 | 4/1956 | Cobb | 308—187 |
| 2,879,114 | 3/1959 | Bowen | 308—180 |
| 2,938,125 | 5/1960 | Marak | 250—106 |

FOREIGN PATENTS

| | | |
|---|---|---|
| 88,470 | 5/1922 | Austria. |
| 311,644 | 5/1929 | Great Britain. |

DAVID J. WILLIAMOWSKY, *Primary Examiner.*

RICHARD A. DOUGLAS, FRANK SUSKO, ROBERT C. RIORDON, *Examiners.*

H. S. KIESER, *Assistant Examiner.*